United States Patent Office 2,905,707
Patented Sept. 22, 1959

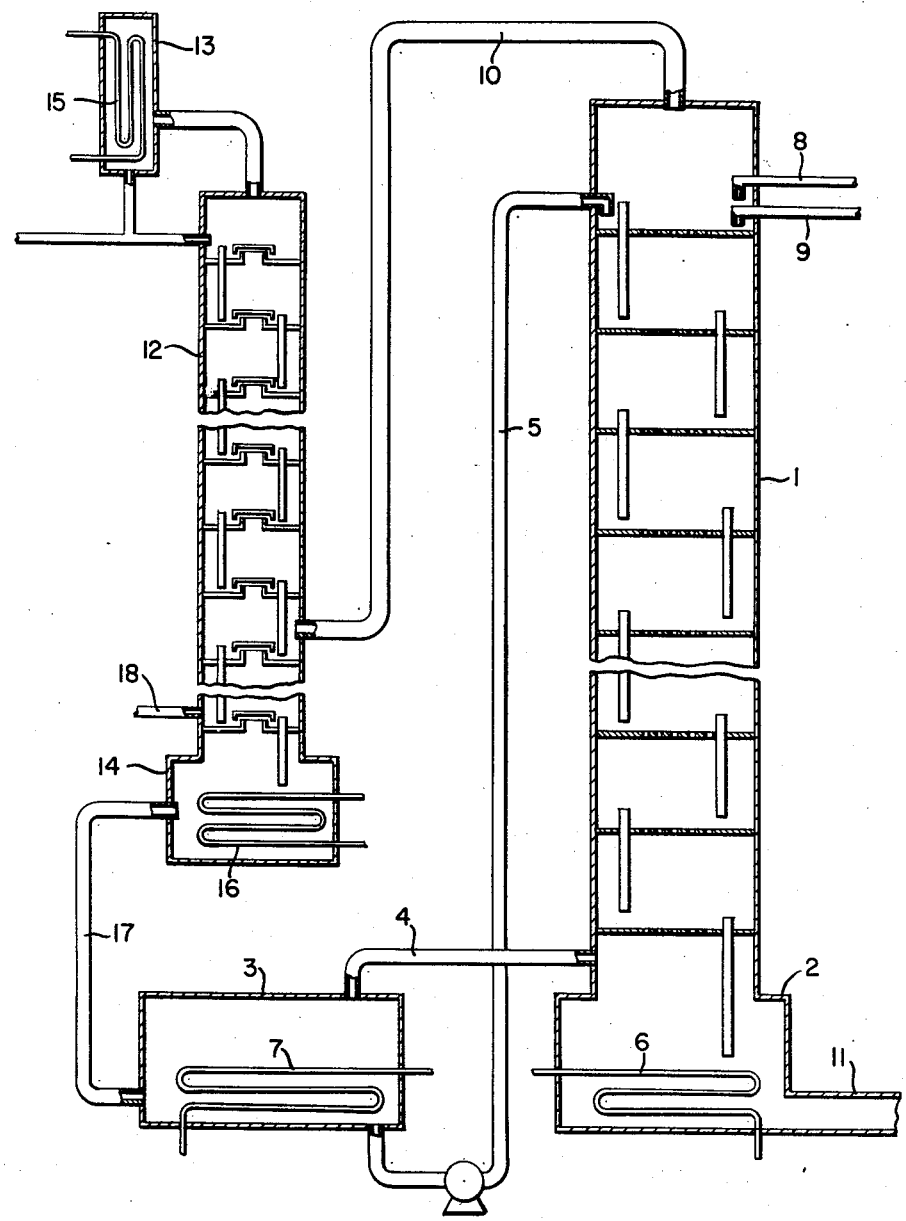

2,905,707

PRODUCTION OF BIS(2-HYDROXYETHYL) TEREPHTHALATE THROUGH ESTER INTERCHANGE

David Morris Hurt and Archie Hamilton Pieper, Wilmington, Del., assignors to E. I. du Pont de Nemours and Company, Wilmington, Del., a corporation of Delaware Application July 30, 1956, Serial No. 600,938

6 Claims. (Cl. 260—475)

This invention relates to alcoholysis of esters. More particularly, it relates to the alcoholysis of a dialkyl terephthalate with a glycol. Still more particularly, it relates to the continuous alcoholysis of a dialkyl terephthalate wherein the alkyl radical contains less than 3 carbon atoms with ethylene glycol to produce bis(2-hydroxyethyl) terephthalate and an alkyl alcohol. An important aspect of the invention is concerned with a continuous commercial scale process for the production of bis(2-hydroxyethyl) terephthalate from dimetyl terephthalate and ethylene glycol while continuously removing methyl alcohol from the reaction zone, effecting substantial completion of the reaction.

The alcoholysis or ester interchange reaction between a dialkyl terephthalate and a glycol is known in the prior art. See, for example, Whinfield and Dickson U.S. Patent No. 2,465,319 which discloses batch processes for carrying out the reaction.

It has been found in the development of a continuous commercial scale process for carrying out the above reaction that an undesirable and objectionable amount of diethylene glycol is often formed along with the bis-(2-hydroxyethyl) terephthalate product. The presence of significant amounts of diethylene glycol and higher glycols, by-products of the main reaction, is particularly intolerable for some uses of the main product. For example, when the terephthalate product is subsequently polymerized, and the polymer formed into sheets or films which are used as the supporting base layers in photographic films, such supporting layers made from monomer containing such undesirable glycols exhibit lack of uniformity in physical properties, e.g., nonuniform molecular structure, lowered melting point and variable stretchability.

Surprisingly, it has been found that the objectionable diethylene glycol and higher polyethylene glycols are not formed in an intolerable amount when the above reaction is carried out in a continuous process, wherein the molar ratio of free ethylene glycol to terephthaloyl radicals is maintained within the critical range of 1.5/1 to 3.0/1 throughout the reaction. It has been further found, surprisingly, that the above reaction can be carried out in a continuous commercial scale process which effects substantial completion of the reaction, i.e., a high conversion of the reactants to final products, while maintaining the critical ratio.

It is an object of the present invention to provide a process for the continuous production of bis(2-hydroxyethyl) terephthalate from a dialkyl terephthalate wherein the alkyl radical contains less than 3 carbon atoms and ethylene glycol. Another object is to provide a continuous process for the production of bis(2-hydroxyethyl) terephthalate from dimethyl terephthalate and ethylene glycol. Another object is to provide such a continuous process wherein the molar ratio of free ethylene glycol to terephthaloyl radicals is maintained throughout the reaction within the critical range of 1.5/1 to 3.0/1. Yet another object is to provide such a process which has a high conversion rate, i.e., the (alcoholysis) ester interchange reaction is substantially complete. Still another object is to provide a satisfactory economical commercial scale process for carrying out said reaction. An additional object is to provide such a process wherein the bis(2-hydroxyethyl) terephthalate so produced is of a high order of uniformity and contains only a very small, tolerable amount of diethylene glycol or higher polyethylene glycols, i.e., less than about 2% of such glycols by weight.

The objects of this invention are accomplished by adjusting a reaction zone in which a dialkyl terephthalate wherein the alkyl radical contains less than 3 carbon atoms and ethylene glycol are made to react at elevated temperatures to produce bis(2-hydroxyethyl) terephthalate and an alkyl alcohol, wherein the concentration of free ethylene glycol to terephthaloyl radicals in the reaction zone is maintained within the critical mol ratio range between 1.5/1 and 3.0/1 while continuously removing the alkyl alcohol which is produced. The process of the invention is carried out by introducing into the upper portion of the reaction zone as reactants the liquid dialkyl terephthalate, liquid ethylene glycol and an ester interchange catalyst, permitting these reactants to pass downwardly through a reaction zone in which said reactants intimately contact vapors passing up through the reaction zone. These last mentioned vapors comprise partly alkyl alcohol formed in the ester interchange reaction and also ethylene glycol vapors rising from the lower portion of the reaction zone. The alkyl alcohol vapors move upwardly with the rising vapor stream and pass out of the upper portion of the reaction zone as exit vapors, which may contain some uncondensed ethylene glycol and a small quantity of unreacted entrained dialkyl terephthalate or dialkyl terephthalate vapor. The liquid bis(2-hydroxyethyl) terephthalate product plus some unreacted components are permitted to flow progressively down through the reaction zone.

The liquid product passes downwardly from the reaction zone into a heated collecting zone wherein constant temperature heating vaporizes substantially all the free ethylene glycol which may be present. The bis(2-hydroxyethyl) terephthalate product on removal from the collecting zone exhibits a concentration uniformly of less than 0.5 mol of free ethylene glycol per mol of terephthaloyl radicals. In addition to this minor amount of free ethylene glycol, the product, of course, also contains the ester interchange catalyst material and may contain a very minor unobjectionable amount of low molecular weight polymers, e.g., dimers and trimers of bis(2-hydroxyethyl) terephthalate. However, the liquid product contains only a very small, tolerable amount, i.e., less than about 2% by weight, of diethylene glycol and higher polyethylene glycols.

It is an essential part of this invention to provide a separate additional source of ethylene glycol vapor connected with the lower portion of the reaction zone. Control of the rate at which the ethylene glycol vapor rises within the reaction zone can thus be maintained from such outside source without need for altering the temperature in the heated collecting zone. It is necessary to have the collecting zone temperature substantially constant throughout the reaction in order to provide uniformity, especially of free ethylene glycol content, of the end product as it leaves the collecting zone.

It is an essential part of this invention to continuously introduce liquid ethylene glycol into the upper portion of the reaction zone by means of which the desired molar ratio for the reaction can be established.

The molar ratio of free ethylene glycol to terephthaloyl radicals is defined as the number of mols of unreacted ethylene glycol in the liquid phase in the reaction zone, per mol of terephthaloyl radicals in the reaction zone, i.e., the total number of —OCC$_6$H$_4$CO— radicals, whether present in the form of dialkyl terephthalate, bis(2-hydroxyethyl) terephthalate, some intermediate compound or low molecular weight polymer of bis(2-hydroxyethyl) terephthalate.

In a preferred process for carrying out the invention, liquid dimethyl terephthalate, an ethylene glycol liquid solution of an ester interchange catalyst for the reaction, and a supply of liquid ethylene glycol are continuously introduced into the upper portion of a reaction zone, e.g., a multiple sieve plate reactor column, from which upper portion the liquid reactants and reaction products pass progressively downwardly through the reaction zone in intimate contact with ethylene glycol vapors rising through the reaction zone. Methyl alcohol formed in the reaction is vaporized into the upwardly moving ethylene glycol vapor stream and passes out of the reaction zone near its top. Receiving the liquid reaction products as they leave the bottom of the reaction zone is a heated collecting zone, which is provided with a discharge outlet as a means for removing the bis(2-hydroxyethyl) terephthalate. A separate ethylene glycol vapor source is provided with a connecting line to the lower portion of the reaction zone for the introduction of ethylene glycol vapors into said reaction zone.

In the process of this invention, the free ethylene glycol to terephthaloyl radical mol ratio in the reaction zone is established by adjusting the rate of input of liquid ethylene glycol into the upper portion of the reaction zone. This input rate basically determines the amount of excess ethylene glycol present in the reaction and, therefore, serves to establish a desired molar ratio in the start of operation of this process. Once the ratio has been established within the desired critical range between 1.5/1 to 3.0/1, process conditions of temperature and pressure are maintained essentially constant throughout the reaction zone by controlling, i.e., varying as necessary, the rate at which ethylene glycol vapors rise in the reaction zone. This latter control or adjustment is accomplished by varying as required the rate of introduction of ethylene glycol vapors into the lower portion of the reaction zone from the separate external source of ethylene glycol vapors.

Surprisingly, the process and control accomplished according to this invention enables greater than 99.5% conversion of the dialkyl terephthalate to bis(2-hydroxyethyl) terephthalate. Furthermore, since the rate at which ethylene glycol vapors enter the lower portion of the reaction zone is determined from a location separate from the collecting zone, no change in the temperature of the collecting zone is required, thus enabling the production of a highly uniform product.

The collecting zone is preferably maintained at a substantially constant temperature sufficient to vaporize ethylene glycol from the liquid reaction products in the collecting zone. The temperature is held substantially constant in order to maintain a uniform substantially constant molar ratio of free ethylene glycol to terephthaloyl radicals, as stated above. The reaction products entering the collecting zone exhibit a molar ratio of free ethylene glycol to terephthaloyl radicals within the range to 1.5/1 and 3.0/1, and this ratio may be further reduced to as low as 0.5/1 and preferably under 0.25/1 by proper selection of the temperature of the collecting zone. The precise temperature of the collecting zone will depend on several considerations, e.g., too high a temperature promotes degradation of the end products and formation of undesired side reaction products while too low a temperature is uneconomical. Suitable temperatures are given below.

The present invention will be more clearly understood by reference to the accompanying drawing which illustrates a preferred arrangement of apparatus which has been found to be particularly economical and useful for carrying out the process of this invention.

Referring to the drawing, the alcoholysis (ester interchange) reaction takes place in a sieve plate reactor column 1, which has at its base associated collecting boiler 2. Separate ethylene glycol boiler 3 is provided with connecting vapor feed line 4 leading to the lower portion of the reactor column and connecting liquid feed line 5 leading to the upper portion of the reactor column. The temperature of the collecting boiler is controlled by means of a heat-transfer agent circulating in collecting boiler coil 6. Temperature control of the ethylene glycol boiler is similarly effected by ethylene glycol boiler coil 7.

Feed lines 8 and 9 provide inlets for the introduction into the reactor column respectively of the liquid dialkyl terephthalate and ester interchange catalyst solution. The exit vapors pass out of the upper portion of the reactor column through exit line 10. Bis(2-hydroxyethyl) terephthalate containing less than 0.5% of the terephthaloyl radicals as dialkyl terephthalate is collected in the collecting boiler 2, from which it is removed through discharge line 11.

Rectifier column 12 with its associated alkyl alcohol condenser 13 and rectifier column reboiler 14 are provided for recovering reactants in the exit vapors from the reactor column 1, thus permitting their reuse where possible by recycling the recovered reactants back into the reactor column. Temperature control of the alkyl alcohol condenser 13 and the rectifier column reboiler 14 is effected by cooling coil 15 and heating coil 16 respectively. Connecting line 17 is provided between the rectifier column reboiler 14 and the ethylene glycol boiler 3 as a means for transferring overflow from the rectifier column reboiler 14. New ethylene glycol is introduced into the system through feed line 18.

According to the process of this invention, liquid ethylene glycol, through feed line 5, liquid dialkyl terephthalate, e.g., dimethyl terephthalate, through feed line 3, and a liquid solution of an ester interchange catalyst, e.g., zinc acetate dihydrate in ethylene glycol solvent, through feed line 9, are introduced into the upper portion of reactor column 1. These reactants pass downwardly through the plates of the reactor column in intimate contact with vapors passing up through the reactor column. As is well known in the art, the liquid reactants and reaction products passing downwardly remain on top of each sieve plate for a time and slowly fall through the downcomers onto the next lower plate, thereby resulting in intimate liquid-vapor contact with the vapor stream which is rising through the sieve holes.

The rising vapors are in part alkyl alcohol reaction product and partly vaporous ethylene glycol. These glycol vapors come partly from the pool of liquid reaction products in the collecting boiler 2 and partly from the ethylene glycol boiler 3 through feed line 4. The intimate contact between the reactants passing downwardly in the liquid phase plus the agitating or mixing effect of the rising ethylene glycol vapors, which act to strip the alkyl alcohol from the falling reactants and reaction products and carry the alkyl alcohol upwards, drive the alcoholysis (ester interchange) reaction towards the formation of bis(2-hydroxyethyl) terephthalate. In the collection boiler 2, with its associated heating coil 6, the liquid reaction products are stripped of almost all of the remaining free ethylene glycol which may be present, leaving highly uniform bis(2-hydroxyethyl) terephthalate, which is preferably drawn off continuously but which can be drawn off through discharge line 11 at convenient intervals within the volume capacity limit of the collecting boiler 2. As previously stated, the liquid reaction product may also contain a relatively small amount of free ethylene glycol and low molecular weight polymers of bis(2-hydroxyethyl) terephthalate, but contains only a very small, tolerable amount, i.e., less than about 2% by weight, of diethylene glycol and higher polyethylene glycols.

The exit vapors are predominately alkyl alcohol in which some uncondensed ethylene glycol and a small quantity of unreacted dialkyl terephthalate may be present. These vapors pass through exit line 10 into rectifier column 12 where they undergo rectification. Vapors from the rectification process pass to the alkyl alcohol condenser 13, with its associated cooling coil 15, wherein the alkyl alcohol vapors are condensed for removal from the system. The liquid refluxing from the rectifier column passes downwardly into the rectifier column reboiler 14 with its associated heating coil 16. This liquid comprises primarily unreacted ethylene glycol, which is now free of alkyl alcohol, plus a small quantity of unreacted dialkyl terephthalate. New ethylene glycol in the liquid phase is conveniently introduced into the system through feed line 18 into the lower portion of the rectifier column.

Overflow from the rectifier column reboiler 14 is made up therefore of liquid ethylene glycol and a small amount of dialkyl terephthalate from the exit vapors of the reactor column 1 and new ethylene glycol being introduced through feed line 18. This overflow passes through connecting line 17 into the ethylene glycol boiler 3 with its associated coil 7. The greater part of the rectifier column reboiler overflow is vaporized in the ethylene glycol boiler 3 and fed to the lower portion of the reactor column 1 through feed line 4, while the remainder as liquid is fed to the top of the reactor column through feed line 5.

The ester exchanger reaction zone, e.g., the reactor column, is operated with the upper portion of the zone, e.g., the top or feed plate in the reactor column, at a temperature substantially above the boiling point of the alcohol formed in the reaction and not over about the boiling point of the ethylene glycol at the operational pressure. At the preferred pressure, which is atmospheric at the top of the rectifier column, the temperature of the upper portion of the zone is within the range from about 150° C. to about 190° C. Below the lower limit of this range the chemical reaction rate is very slow, while above the upper limit of the range the passage of dialkyl terephthalate as an exit vapor is excessive. For the upper portion of the zone, temperatures between 155° C. and 165° C. are preferred, with approximately 160° C. believed to be the optimum temperature.

The lower portion of the reaction zone, e.g., reactor column, is maintained within the range from about 200° C. to about 235° C., preferably between 210° C. and 215° C., with approximately 212° C. believed to be the optimum temperature.

The collecting boiler is maintained at a substantially constant temperature within the range from about 200° C. to 245° C. and preferably between 220° C. and 240° C.

Heat is supplied to the reaction zone from below due to the elevated temperature maintained in the collecting zone. In addition, it is obvious that the reaction zone may be heated by means of external electrical coils or platens or a heat-transfer agent circulating in a zone jacket.

Control of the reaction zone operating temperatures is accomplished by adjusting as needed the rate at which ethylene glycol vapor rises in the reaction zone. As previously stated, the ethylene glycol vapor in the reaction zone is provided from two sources, namely, the collecting zone and the separate ethylene glycol boiler. The rate of ethylene glycol vaporization and boil up from the collecting zone is maintained substantially constant by maintaining a substantially constant temperature in the collecting zone. The rate of introduction of ethylene glycol vapors from the ethylene glycol boiler is varied as desired, thereby effecting control of the total rate of boil up of ethylene glycol vapor in the reaction zone.

Proper adjustment of the process variables, namely, the rate of input of the dialkyl terephthalate, the amount of ester interchange catalyst used, the rate of feed of liquid ethylene glycol into the upper portion of the reaction zone, the collecting zone temperature and the rate of feed of ethylene glycol vapor into the lower portion of the reaction zone, permits the continuous performance of the process with the molar ratio of free ethylene glycol to terephthaloyl radicals throughout the reaction zone within the preferred critical range of 1.5/1 to 3.0/1. Of these variables, it is only the last, viz., the rate of feed of ethylene glycol vapor into the lower portion of the reaction zone, which is altered as needed, once the other variables have been set for a given production run.

The molar ratio of free ethylene glycol to terephthaloyl radicals in the collecting zone, where additional free ethylene glycol is being boiled off, is maintained substantially constant below a preferred limit of 0.5/1 and preferably 0.25 to 1 or lower by keeping the collecting zone temperature substantially constant as described above. Carrying out the process of the above described invention results in there being drawn off from the collecting zone an end product of a high degree of uniformity, substantially free from diethylene glycol, and which contains less than 0.5 mol percent of the dialkyl terephthalate originally introduced into the process, indicating that the conversion is greater than 99.5 mol percent.

The invention will be further illustrated but is not intended to be limited by the following examples:

*Example I*

An apparatus was used similar to that illustrated in the drawing, in which the ester interchange reaction zone was a vertical sieve plate reactor column containing 20 sieve plates which was mounted on a cylindrical boiler containing heating coils. The rectifier column was a bubble-cap column containing 10 bubble-cap plates, which was mounted on an electrically heated boiler. A standard coil-cooled condenser was used to condense the methyl alcohol vapors and a standard electrically heated boiler was used as the ethylene glycol boiler. Liquid dimethyl terephthalate at a temperature of approximately 170° C. was fed at about 50 pounds per hour into the upper portion of the sieve plate column above the top plate. An ethylene glycol solution of zinc acetate dihydrate catalyst (0.5% by weight) was similarly introduced into the sieve plate column. The rate of introduction of the catalyst solution was maintained at a level sufficient to provide a concentration of 126 parts of metallic zinc per million parts of dimethyl terephthalate being introduced. Fresh ethylene glycol at a temperature of approximately 170° C. was fed to the lower portion of the rectifier column above the bottom bubble-cap plate at a rate of about 30 pounds per hour. At the same time, ethylene glycol recycled from the ethylene glycol boiler containing a small amount of unreacted dimethyl terephthalate was fed to the sieve plate column above the top plate at a rate of about 20 pounds per hour. The average temperature at the top plate of the sieve plate column was 168° C. The temperature at the bottom plate of the column was 212° C. The temperature of the sieve plate column reboiler was 235° C. The rate of boil-up of the ethylene glycol vapor in the sieve plate column was approximately 55 pounds per hour and the hold up time for the reactants in the column was approximately 2⅓ hours. Under these conditions, the molar ratio of free ethylene glycol to terephthaloyl radicals at a position in the sieve plate column 6 plates below the top plate was 1.8/1 and measurement at that point showed that 56 mol percent of the original dimethyl terephthalate had been converted to bis(2-hydroxyethyl) terephthalate. At the second plate from the bottom of the column the molar ratio of free glycol to terephthaloyl radicals was 2.3/1 and the conversion was 99.2 mol percent. In the product leaving the column reboiler at a continuous rate of about 63 pounds per hour, the conversion was 99.9 mol percent. The product contained less than 0.25 mol of free ethylene glycol per mol of terephthaloyl radicals, was essentially free, i.e., contained less than about 2% by weight, of diethylene glycol and was of excellent uniformity. The material was subsequently polymerized without difficulty to form a polymer of high quality, which, when formed into thin sheets, exhibited excellent optical clarity, was relatively free from spots and blemishes, possessed excellent stretchability and high uniformity of physical properties.

*Example II*

Using apparatus and process conditions as in Example I, with a boil-up rate of about 74 pounds per hour and an average temperature of 182° C. at the top plate of the column, the molar ratio of free ethylene glycol to terephthaloyl radicals at a point in the column two plates below the top plate was 1.6/1 and the conversion was 51 mol percent. At the second plate above the reboiler, the ratio was 2.4/1 and the conversion was 99.7 mol percent. The product of this example likewise contained less than 0.25 mol of free ethylene glycol per mol of terephthaloyl radicals, was uniform and essentially free from diethylene glycol and polymerized well to yield a polymer of excellent quality. Films made from this polymer showed the same excellent characteristics as in Example I.

Various ester interchange reaction catalysts may be used in carrying out the process of this invention. These include compounds containing lithium, sodium, potassium, calcium, beryllium, magnesium, cadmium, aluminum, chromium, molybdenum, manganese, iron, cobalt, nickel, copper, silver, mercury, tin, lead, zinc, bismuth, antimony platinum, palladium, lanthanum, cerium, titanium, and germanium. Zinc acetate dihydrate is the preferred catalyst. A range of catalyst rates between 84 and 210 parts of elemental metal in a catalytic compound per million parts by weight of alkyl terephthalate may be used, with the preferred rate between 120 and 130 parts per million and an optimum rate, for the preferred catalyst, of 126 parts per million.

Feed inlets into the reaction zone for the reactants are preferably located near the top of the reaction zone or, where the zone is a reactor plate column, above the top plate of the reactor column. However, these inlets may alternatively be located any place in the upper half of the reaction zone, or, where the reaction zone is a reactor plate column, above any of the plates in the upper half of the column. Lowering the inlet position would decrease the residence time of the reactants in the reaction zone, which would increase the quantity of dialkyl terephthalate in the end product, seriously affecting the economics of the process. Therefore, the higher position for introducing the reactants is preferred.

The dialkyl terephthalate is usually heated to the operating temperature of the upper portion of the reaction zone prior to the introduction into the zone. The solution of the catalyst in ethylene glycol is not heated prior to introduction in order to avoid precipitation of the catalyst which in turn would destroy the value of the material as a catalyst in this process.

Although the invention is illustrated by showing new ethylene glycol being introduced into the system at the lower portion of the rectifier column, alternative feed locations are satisfactory. The new ethylene glycol thus can be introduced into the rectifier column reboiler or into the ethylene glycol boiler, in which cases preheating of the ethylene glycol is unnecessary. However, preheating of the ethylene glycol is required if the ethylene glycol is fed into the rectifier column to avoid an objectionable temperature disturbance.

The inlet from the ethylene glycol boiler into the lower portion of the reaction zone for introducing ethylene glycol vapor can be at any convenient place in the lower half of the reaction zone, or where the zone is a reactor plate column, immediately above any of the plates in the lower half of the column. The preferred position for the inlet in the illustrated preferred apparatus is immediately below the bottom plate in the reactor plate column.

Alternative types of apparatus which can be used for the reaction column include bubble-cap plate columns, packed columns or other standard types of vapor-liquid contacting devices with a liquid hold-up time sufficient to react completely the components fed to the system. Other types of well known rectification apparatus can, of course, be used in place of the bubble-cap plate column as the rectifier column.

Although the process has been described as taking place in a single reactor column, it is obvious that a series of reactor columns, each with its own associated collecting boiler and condenser could be substituted in this process. The product from one column could then be fed to the other columns in series.

The system could also be modified by feeding the reactants into the middle portion of the reaction zone while using the upper portion of the column as a rectifier for the separation of alkyl alcohol and ethylene glycol. In such an arrangement, it would be necessary to divide the reflux stream from the rectification section between the lower portion of the reaction zone and the ethylene glycol boiler. This could be accomplished by the addition of flow controls on the overflow stream from the rectification section.

An advantage of the process of this invention is that it provides a method for the continuous production of bis(2-hydroxyethyl) terephthalate from dialkyl terephthalate wherein the alkyl radical contains less than 3 carbon atoms and ethylene glycol. Another advantage is that it provides such a continuous process wherein the molar ratio of free ethylene glycol to terephthaloyl radicals can be maintained within the critical range of 1.5/1 to 3.0/1 throughout the reaction. Yet another advantage is that it provides such a process which exhibits a high conversion rate, i.e., the alcoholysis (ester interchange) reaction is substantially complete on the order of 99.5 mol percent or better. An additional advantage is that it permits of the production of bis(2-hydroxyethyl) terephthalate of a high order of uniformity which is essentially free of diethylene glycol and which is useful for making polyethylene terephthalate films which can be biaxially oriented into films of uniform thickness, optical properties, a high degree of uniformity of physical properties and suitable as photographic film base. Still another advantage is that it provides an extremely flexible, economical process for continuously carrying out said reaction.

The invention claimed is:

1. A continuous process for preparing bis(2-hydroxyethyl) terephthalate which comprises reacting at elevated temperatures liquid dialkyl terephthalate wherein the alkyl radical contains less than three carbon atoms with liquid ethylene glycol in the presence of an ester interchange catalyst in a reaction zone wherein the liquid dialkyl terephthalate, ethylene glycol and liquid reaction products thereof pass downwardly into a heated collecting zone which is maintained at a temperature sufficient to vaporize ethylene glycol from said liquid reaction products and passing the ethylene glycol vapors into the lower part of said reaction zone, said liquids being in intimate contact while passing downwardly with upwardly moving ethylene glycol vapors and alkyl alcohol vapors formed in the reaction, controlling the rate at which ethylene glycol vapors rise through said reaction zone by introducing ethylene glycol vapors from a source separate from said collecting zone into the lower portion of said reaction zone, maintaining during the entire said continuous process the molar ratio of free ethylene glycol to terephthaloyl radicals in said reaction zone within the range from 1.5/1 to 3.0/1, continuously removing said upwardly moving ethylene glycol vapors and alkyl alcohol vapors from the upper portion of said reaction zone as exit vapors, and removing liquid bis(2-hydroxyethyl) terephthalate continuously from said collecting zone.

2. A process according to claim 1 wherein ethylene glycol recovered from said exit vapors is recycled into said reaction zone in the form of vapor.

3. A process according to claim 1 wherein the collecting zone temperature is maintained within the range from 220° C. to 240° C.

4. A process according to claim 3 wherein the temperature of the upper portion of said reaction zone is maintained substantially above the boiling point of the alkyl alcohol formed in the reaction and not over about the boiling point of ethylene glycol.

5. A process according to claim 4 wherein said dialkyl terephthalate is dimethyl terephthalate.

6. A process according to claim 5 wherein said catalyst is zinc acetate dihydrate.

References Cited in the file of this patent

UNITED STATES PATENTS

| | | |
|---|---|---|
| 2,465,319 | Whinfield et al. | Mar. 22, 1949 |
| 2,534,028 | Izard | Dec. 12, 1950 |
| 2,662,093 | Billica | Dec. 8, 1953 |
| 2,681,360 | Vodonik | June 15, 1954 |
| 2,806,052 | Siggel | Sept. 10, 1957 |
| 2,829,153 | Vodonik | Apr. 1, 1958 |